(12) United States Patent
Ganesh et al.

(10) Patent No.: US 11,605,022 B2
(45) Date of Patent: Mar. 14, 2023

(54) SYSTEMS AND METHODS FOR MEASURING AND VALIDATING KEY PERFORMANCE INDICATORS GENERATED BY MACHINE LEARNING MODELS

(71) Applicant: Verizon Patent and Licensing Inc., Arlington, VA (US)

(72) Inventors: Vinod Khanna Saini Ganesh, Wesley Chapel, FL (US); Travis R. McLaren, Southlake, TX (US); Sailesh K. Mishra, Frisco, TX (US); Rajat Sharma, Southlake, TX (US); Pavani Kamalapuram, Frisco, TX (US); Pritam Bedse, Coppell, TX (US); Senthil Muthusamy, Frisco, TX (US); Rishi Kanth Chitti, Irving, TX (US); John Russo, Dix Hills, NY (US); Srinivasan Krishnamurthy, Irving, TX (US); Khagender Arrekuti, Lombard, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 611 days.

(21) Appl. No.: 16/658,950

(22) Filed: Oct. 21, 2019

(65) Prior Publication Data
US 2021/0117852 A1    Apr. 22, 2021

(51) Int. Cl.
*G06F 9/44* (2018.01)
*G06N 20/00* (2019.01)
*G06F 11/34* (2006.01)
*G06Q 10/0639* (2023.01)

(52) U.S. Cl.
CPC ......... *G06N 20/00* (2019.01); *G06F 11/3466* (2013.01); *G06Q 10/06393* (2013.01)

(58) Field of Classification Search
CPC ................ G06N 20/00; G06F 11/3466; G06Q 10/06393
USPC .................................................. 717/100–120
See application file for complete search history.

(56) References Cited

U.S. PATENT DOCUMENTS

2020/0372472 A1* 11/2020 Kenthapadi ............ G06N 20/20

* cited by examiner

*Primary Examiner* — Chuck O Kendall

(57) ABSTRACT

A device may receive, from a customer platform, customer event data identifying events occurring between customers and an entity, and may receive, from the customer platform, customer action data generated by machine learning models and identifying customer actions to be taken by the customer platform in response to the occurrence of the events. The device may receive, from the customer platform, customer results data identifying results of the customer actions taken by the customer platform, and may calculate current key performance indicators based on the customer event data, the customer action data, and the customer results data. The device may retrain one or more of the machine learning models based on the current key performance indicators to generate one or more retrained machine learning models, and may provide the one or more retrained machine learning models to the customer platform.

20 Claims, 14 Drawing Sheets

100 →

Analytics platform
115

150
Perform one or more actions based on the current KPIs

Provide, to a user device, a user interface that includes the current KPIs

Provide, to a user device, a user interface that includes recommendations for new machine learning models and machine learning models to eliminate Cause a customer action to be modified based on the current KPIs Cause a new customer action to be performed based on the current KPIs Determine an anomaly in the customer platform based on the current KPIs Retrain one of the machine learning models based on the current KPIs

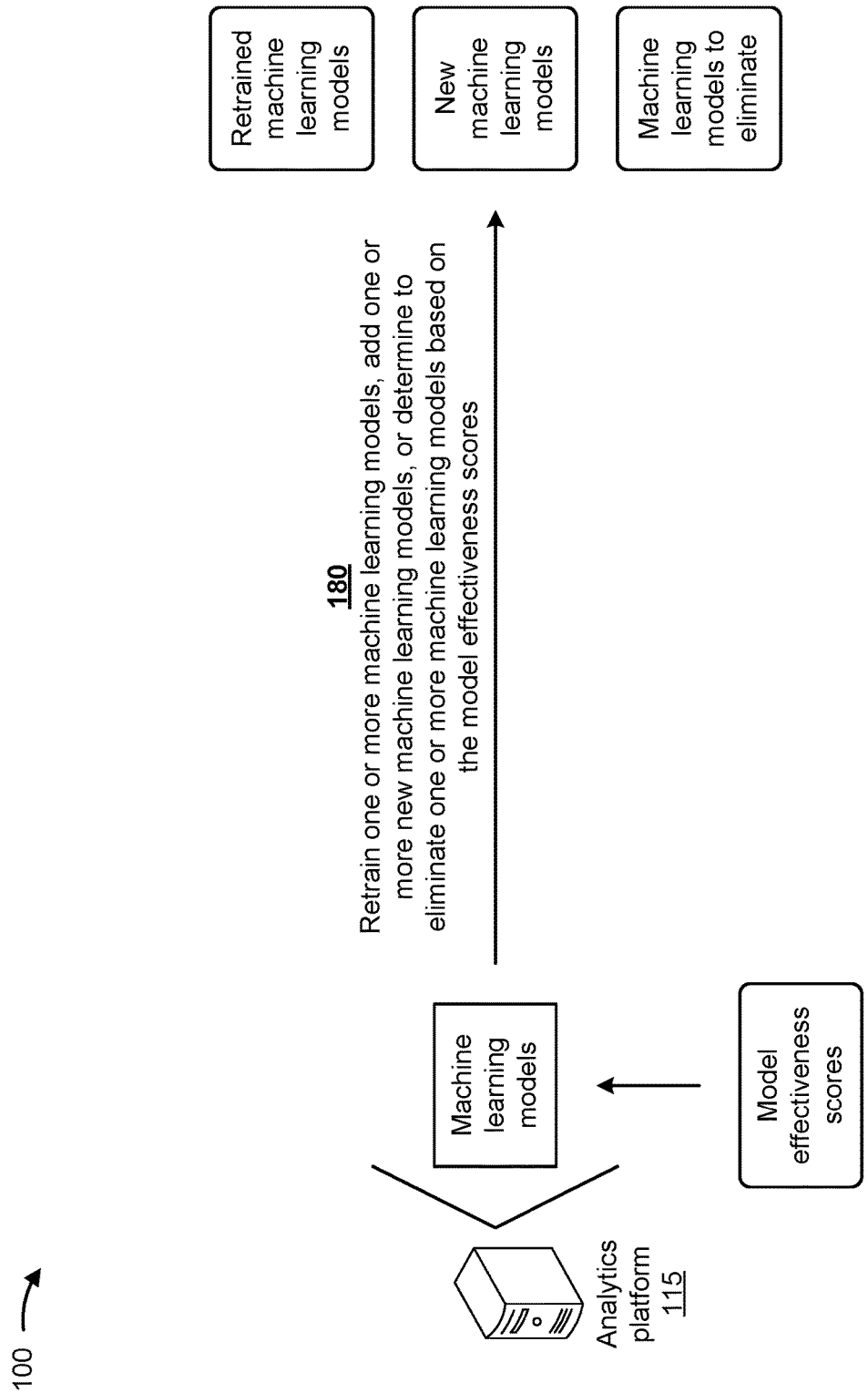

SYSTEMS AND METHODS FOR MEASURING AND VALIDATING KEY PERFORMANCE INDICATORS GENERATED BY MACHINE LEARNING MODELS

BACKGROUND

Machine learning models may deploy solutions within target engagement channels (e.g., mobile applications, the Internet, set-top boxes, telephones, chat bots, and/or the like) to address customer experience deficiencies, reduce negative outcomes (e.g., live agent calls, customer churn, and/or the like), increase positive outcomes (e.g., upgrade services, purchase additional services, and/or the like), and/or the like.

BRIEF DESCRIPTION OF THE DRAWINGS

FIGS. 1A-1K are diagrams of one or more example implementations described herein.

DETAILED DESCRIPTION OF PREFERRED EMBODIMENTS

Figure 1A:
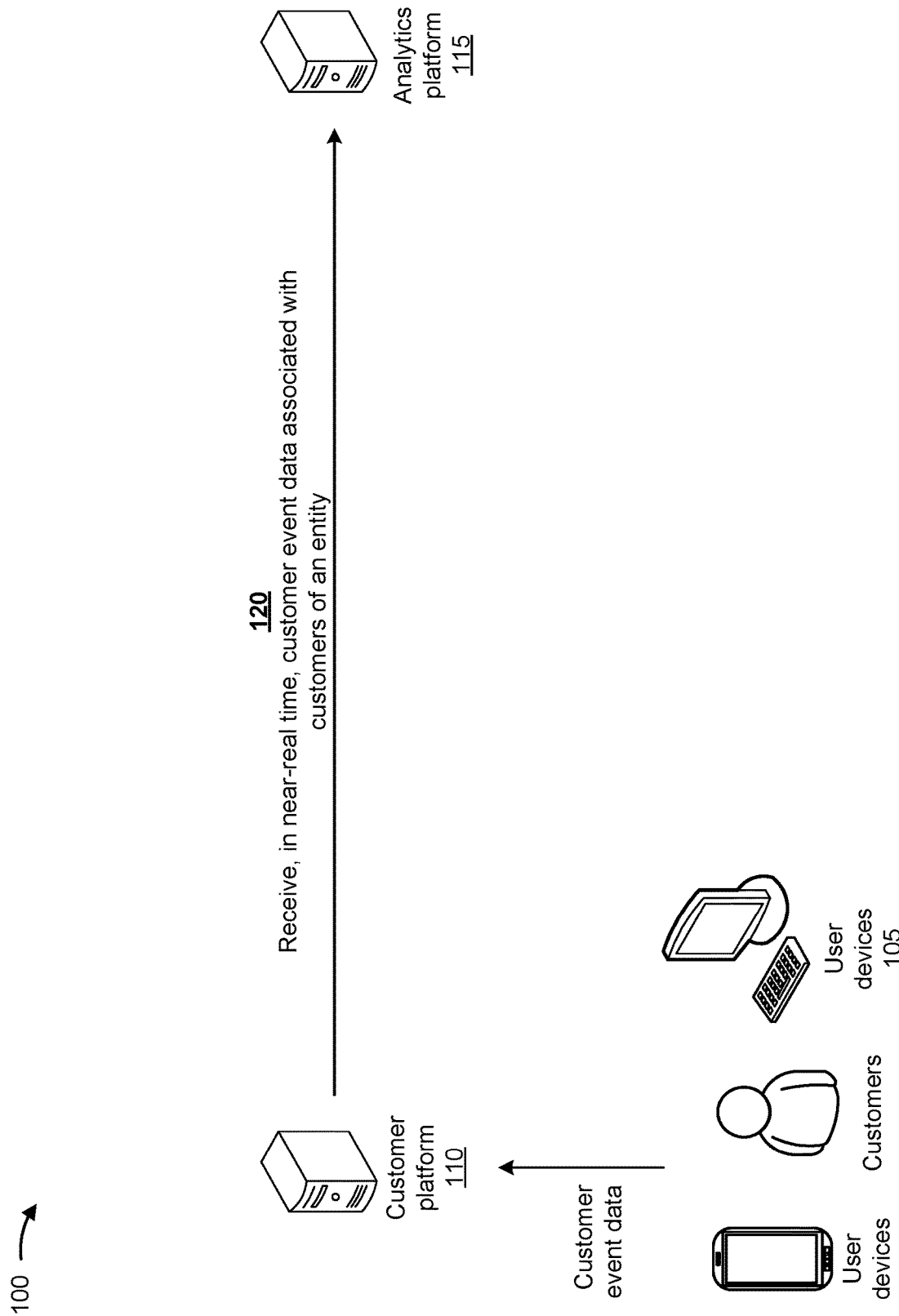

The following detailed description of example implementations refers to the accompanying drawings. The same reference numbers in different drawings may identify the same or similar elements.

Once customer solutions are deployed, efforts to measure and validate impacts of the solutions (e.g., what occurred after engagements, whether desired outcomes occurred, and/or the like) may be both cumbersome and ineffective. For example, validation of the solutions is typically a task that requires hundreds, thousands, and/or the like of manhours per year, and ongoing validation of the solutions is typically performed on an ad-hoc basis only when an issue is uncovered or reported. Thus, validation of the solutions wastes computing resources (e.g., processing resources, memory resources, and/or the like), communication resources, networking resources, and/or the like associated with implementing incorrect solutions, identifying the incorrect solutions, correcting the incorrect solutions if discovered, and/or the like.

Another problem relates to measuring impacts of the solutions on key performance indicators (KPIs) over time. Typically, an impact of a solution is determined based on establishing a baseline performance for a KPI, and calculating a change in the KPI, from the baseline, after the solution is implemented. Such a determination may be adequate for short-term measurements, but diminishes over time as other factors affect the baseline and make the baseline undesirable to measure against. Thus, measuring impacts of the solutions wastes computing resources, communication resources, networking resources, and/or the like associated with performing measurements that are useless, continuing performance of incorrect solutions, correcting the incorrect solutions if discovered, and/or the like.

Some implementations described herein provide an analytics platform that measures and validates key performance indicators generated by machine learning models. For example, the analytics platform may receive, from a customer platform, customer event data associated with customers of an entity. The customer event data may include data identifying events occurring between the customers and the entity, and may be received in near-real time relative to occurrence of the events. The analytics platform may receive, from the customer platform, customer action data that includes data identifying customer actions to be taken by the customer platform in response to the occurrence of the events. The customer action data may be generated by a plurality of machine learning models, and may be received in near-real time relative to generation of the customer actions by the plurality of machine learning models. The analytics platform may receive, from the customer platform, customer results data identifying results of the customer actions taken by the customer platform, and may calculate current key performance indicators based on the customer event data, the customer action data, and the customer results data. The analytics platform may retrain one or more of the plurality of machine learning models based on the current key performance indicators to generate one or more retrained machine learning models, and may provide the one or more retrained machine learning models to the customer platform.

In this way, the analytics platform measures and validates, in near-real time, key performance indicators generated by machine learning models. The analytics platform enables validation of impacts of solutions in near-real time so that solutions can be quickly and easily evaluated, maintained, eliminated, and/or the like. Unlike current techniques, the analytics platform also enables measurement of impacts of the solutions on KPIs over time. Thus, the analytics platform conserves computing resources, communication resources, networking resources, and/or the like that would otherwise be wasted in implementing incorrect solutions, identifying the incorrect solutions, continuing performance of the incorrect solutions, correcting the incorrect solutions if discovered, performing measurements that are useless, and/or the like.

FIGS. 1A-1K are diagrams of one or more example implementations 100 described herein. As shown in FIG. 1A, user devices 105 may be associated with customers and a customer platform 110. Customer platform 110 may be associated with an analytics platform 115. In some implementations, the customer platform may include a platform that provides next best actions to be taken for customers of an entity. User devices 105 may include mobile devices, computers, telephones, set-top boxes, and/or the like that the customers may utilize to interact with customer platform 110. Customer platform 110 may include machine learning models that consider different actions that can be taken for a specific customer and decide on a best action from the different actions. The best action (e.g., an offer, a proposition, a service, a product, and/or the like) may be determined, by the machine learning models, based on interests and needs of the customer, business objectives and policies of the entity, and/or the like. Analytics platform 115 may include a platform that measures and validates key performance indicators generated by the machine learning models associated with customer platform 110.

As further shown in FIG. 1A, and shown by reference number 120, analytics platform 115 may receive, from customer platform 110 and in near-real time (e.g., relative to receipt by customer platform 110), customer event data associated with customers of an entity. For example, customer platform 110 may receive the customer event data from user devices 105, and may provide the customer event data to analytics platform 115. In some implementations, analytics platform 115 may receive the customer event data in near-real time relative to generation of the customer event data. In some implementations, the customer event data may include data identifying events (e.g., interactions) occurring between the customers and an entity, such as the entity offering a product or a service to the customers, customer selection of a product or a service of the entity, customer utilization of a self-service procedure provided by the entity, customer contact with the entity (e.g., via a telephone call, an email message, a text message, a chat session, a chat bot, and/or the like), customer access of a website of the entity, and/or the like. In some implementations, new customer event data (e.g., associated with a new customer and any type of user device 105) may be received and processed by customer platform 110 (e.g., without any code changes), as described herein.

Figure 1B:
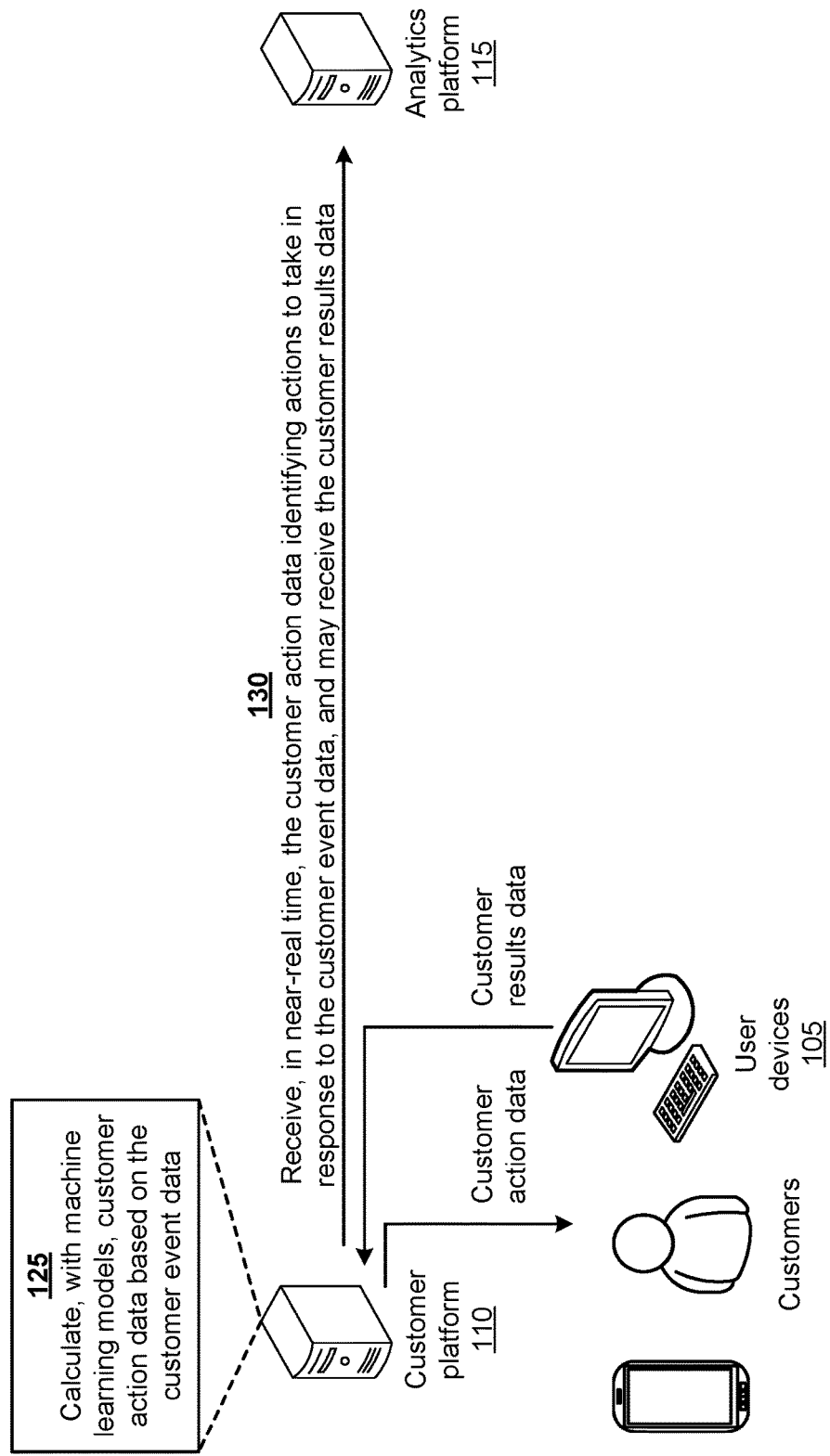

As shown in FIG. 1B, and by reference number 125, customer platform 110 may calculate, with machine learning models, customer action data based on the customer event data. In some implementations, the customer action data may include data identifying customer actions to be taken by customer platform 110 in response to the occurrence of the events identified in the customer event data. The customer actions may include responses to the events occurring between the customers and the entity, such as the entity addressing a customer issue, a representative of the entity answering a customer question, a telephone call by a live agent of the entity with a customer, an upgrade of a product or a service provided to a customer by the entity, a purchase of a new product or service by a customer, a loss of a customer by the entity (e.g., due to customer churn, attrition, turnover, defection, and/or the like), and/or the like. In some implementations, the customer actions may be performed by customer platform 110 and via multiple user devices 105 associated with the customers.

In some implementations, customer platform 110 may receive customer results data in response to performance of the customer actions. For example, the customer results data may include data identifying results of performance of the customer actions, such as retention of a customer based on a customer action, loss of a customer based on a customer action, purchase by a customer of a new product or service based on a customer action, an upgrade of a product or a service by a customer, a positive customer experience by a customer, a negative customer experience by a customer, and/or the like. As further shown in FIG. 1B, the customer results data may be received by customer platform 110 and via user devices 105 associated with the customers.

In some implementations, customer platform 110 may store customer profile attributes associated with the customers. The customer profile attributes may include data identifying statuses (e.g., offline, online, service outages, and/or the like) associated with set-top boxes of the customers, status (e.g., factory resets, encryption key changes, and/or the like) associated with broadband home routers of the customers, voice mail status (e.g., changes in access number) of the customers, email status (e.g., successful logins, login failures, and/or the like) of the customers, expiration dates (e.g., associated with services provided to the customers, associated with customer credit cards, associated with promotions offered to the customers, and/or the like), and/or the like.

As further shown in FIG. 1B, and as shown by reference number 130, analytics platform 115 may receive, in near-real time, the customer action data identifying the customer actions taken by customer platform 110 in response to the occurrence of the events identified in the customer event data, and may receive the customer results data identifying the results of performance of the customer actions. In some implementations, analytics platform 115 may receive the customer action data and the customer result data from customer platform 110. In some implementations, analytics platform 115 may receive the customer action data in near-real time relative to performance of the customer actions by customer platform 110, and may receive the customer results data in near-real time relative to generation of the customer results data.

Figure 1C:
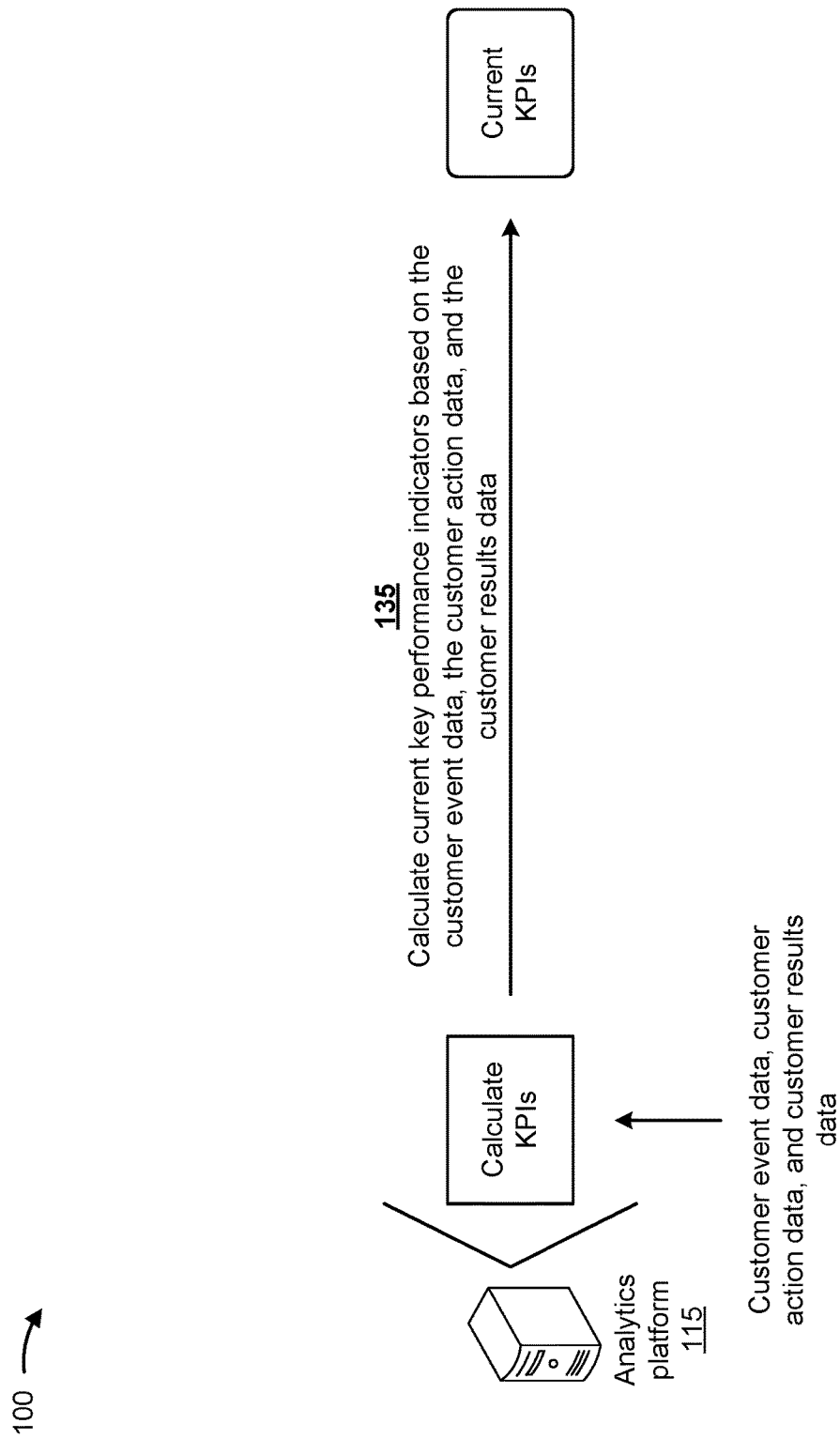

As shown in FIG. 1C, and by reference number 135, analytics platform 115 may calculate current key performance indicators (KPIs) based on the customer event data, the customer action data, and the customer results data. In some implementations, the current KPIs may include data identifying monetary savings generated for a product or a service of the entity, revenue generated for the product or the service, customer retention savings, call savings associated with calls between the customers and the entity, dispatch savings associated with preventing dispatch of technicians by the entity, average handle time reductions associated with handling contacts between the customers and the entity, customer churn reduction for the customers, and/or the like. Analytics platform 115 may utilize KPI formulas (e.g., counts, percentages, sums, averages, ratios, and/or the like) to calculate the current KPIs based on the customer event data, the customer action data, and the customer results data.

Figure 1D:
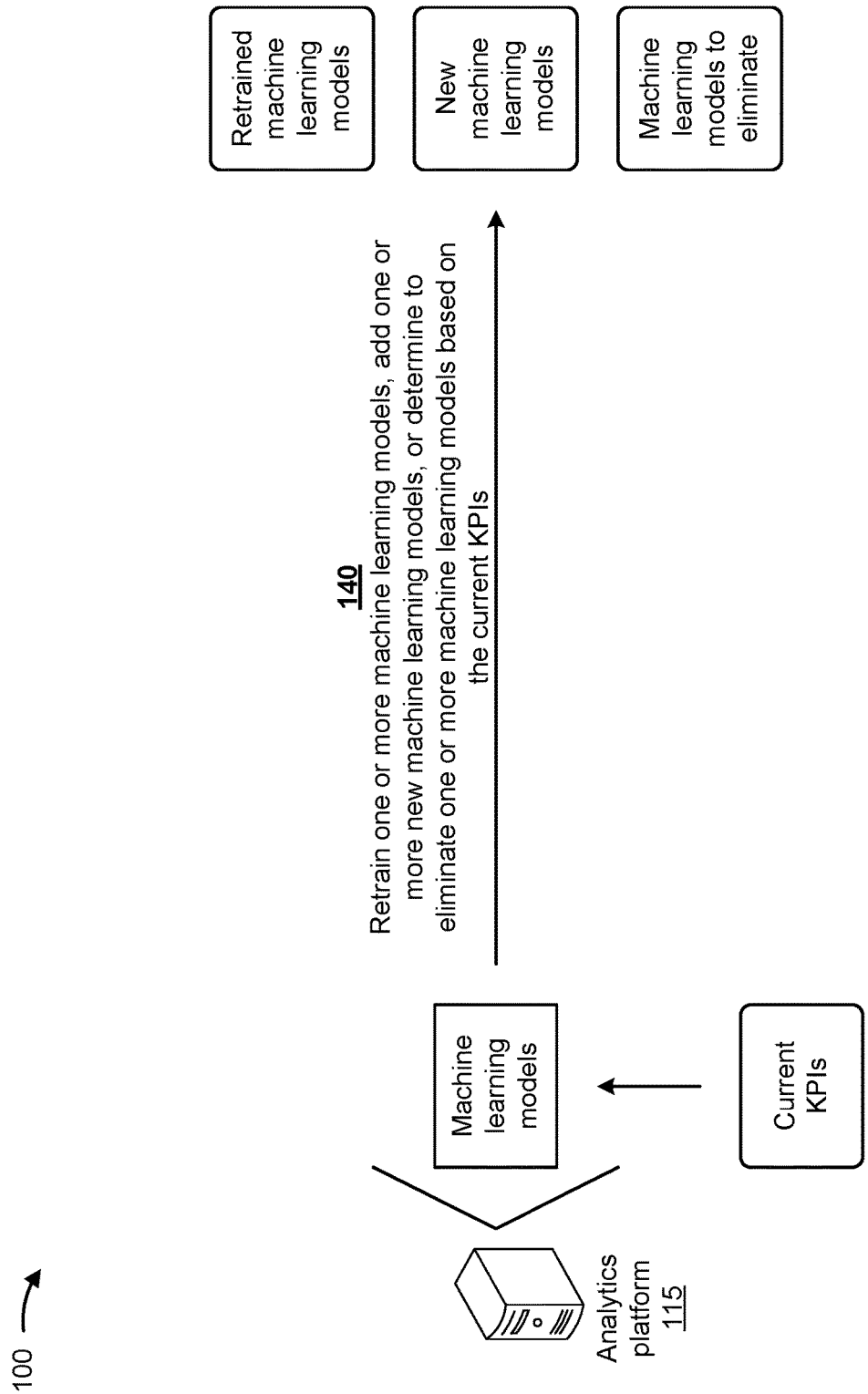

As shown in FIG. 1D, and by reference number 140, analytics platform 115 may retrain one or more machine learning models, add one or more new machine learning models, or determine to eliminate one or more machine learning models based on the current KPIs. For example, based on the current KPIs, analytics platform 115 may retrain one or more machine learning models to generate retrained machine learning models that calculate customer action data based on the customer event data, may add one or more new machine learning models to generate new machine learning models that calculate customer action data based on the customer event data, and/or may determine to eliminate one or more machine learning models.

Analytics platform 115 may train one or more new machine learning models or may retrain a machine learning model, with historical customer event data, to determine customer action data associated with customer actions to be taken in response to occurrence of events. For example, analytics platform 115 may separate the historical customer event data into a training set, a validation set, a test set, and/or the like. The training set may be utilized to train the machine learning model. The validation set may be utilized to validate results of the trained machine learning model. The test set may be utilized to test operation of the machine learning model.

In some implementations, analytics platform 115 may train one or more of the machine learning models using, for example, an unsupervised training procedure and based on the historical customer event data. For example, analytics platform 115 may perform dimensionality reduction to reduce the historical customer event data to a minimum feature set, thereby reducing resources (e.g., processing resources, memory resources, and/or the like) to train the machine learning models, and may apply a classification technique to the minimum feature set.

In some implementations, analytics platform 115 may use a logistic regression classification technique to determine a categorical outcome (e.g., that particular historical customer event data indicates particular customer actions). Additionally, or alternatively, analytics platform 115 may use a naïve Bayesian classifier technique. In this case, analytics platform 115 may perform binary recursive partitioning to split the historical customer event data into partitions and/or branches and use the partitions and/or branches to determine outcomes (e.g., that particular historical customer event data indicates particular customer actions). Based on using recursive partitioning, analytics platform 115 may reduce utilization of computing resources relative to manual, linear sorting and analysis of data points, thereby enabling use of thousands, millions, or billions of data points to train the one or more machine learning models, which may result in a more accurate model than using fewer data points.

Additionally, or alternatively, analytics platform 115 may use a support vector machine (SVM) classifier technique to generate a non-linear boundary between data points in the training set. In this case, the non-linear boundary may be used to classify test data into a particular class.

Additionally, or alternatively, analytics platform 115 may train one or more of the machine learning models using a supervised training procedure that includes receiving input to the machine learning models from a subject matter expert, which may reduce an amount of time, an amount of processing resources, and/or the like to train the machine learning models relative to an unsupervised training procedure. In some implementations, analytics platform 115 may use one or more other model training techniques, such as a neural network technique, a latent semantic indexing technique, and/or the like. For example, analytics platform 115 may perform an artificial neural network processing technique (e.g., using a two-layer feedforward neural network architecture, a three-layer feedforward neural network architecture, and/or the like) to perform pattern recognition with regard to patterns of the historical customer event data. In this case, using the artificial neural network processing technique may improve an accuracy of the one or more trained machine learning models generated by analytics platform 115 by being more robust to noisy, imprecise, or incomplete data, and by enabling analytics platform 115 to detect patterns and/or trends undetectable to human analysts or systems using less complex techniques.

In some implementations, rather than training the machine learning models, analytics platform 115 may receive one or more trained machine learning models from another device (e.g., a server device, customer platform 110, and/or the like). For example, the other device may generate the one or more trained machine learning models based on having trained one or more machine learning models in a manner similar to that described above, and may provide the trained machine learning models to analytics platform 115 (e.g., may pre-load analytics platform 115 with the trained machine learning models, may receive a request from analytics platform 115 for the trained machine learning models, and/or the like).

Figure 1E:
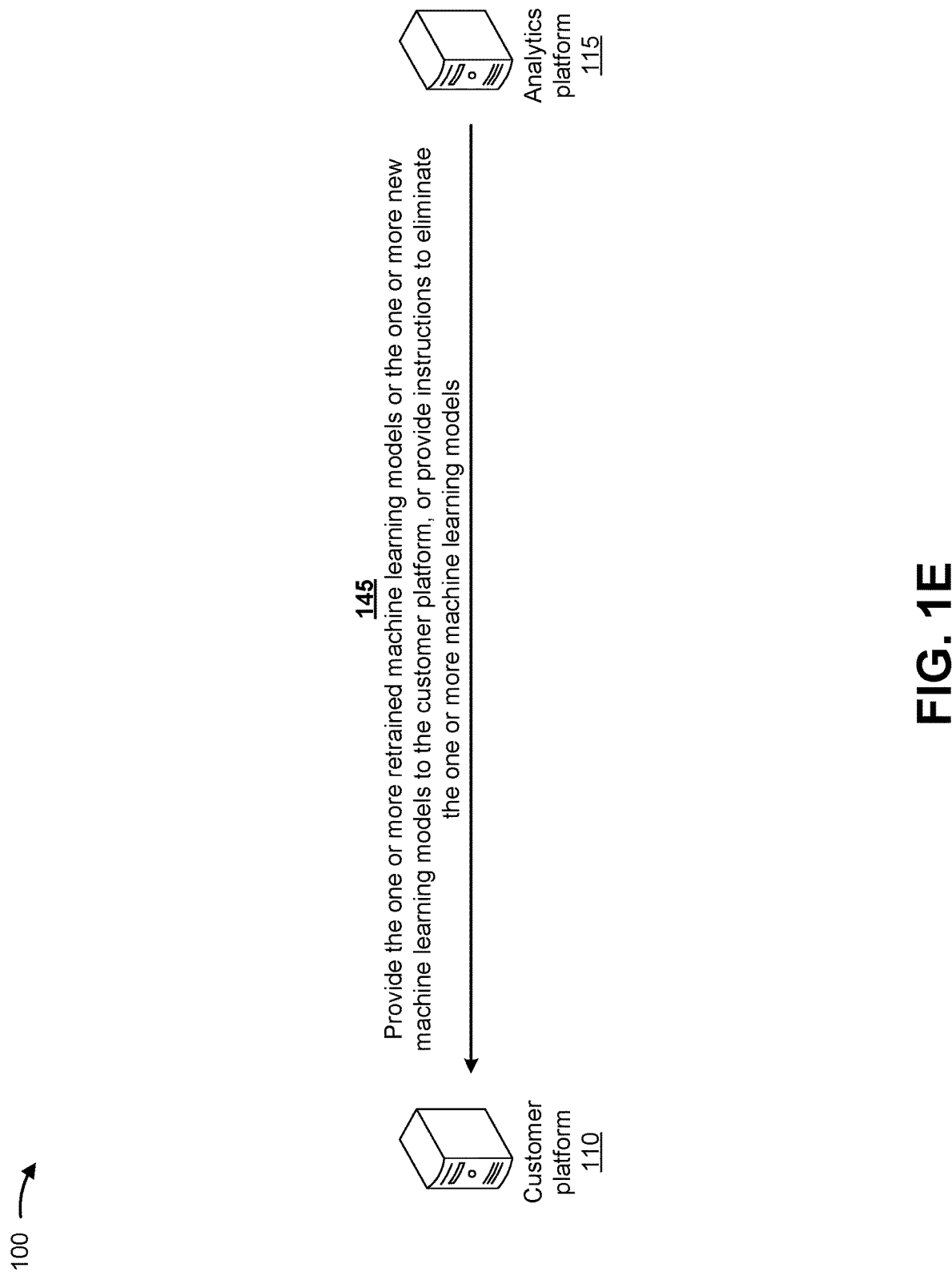

As shown in FIG. 1E, and by reference number 145, analytics platform 115 may provide the one or more retrained machine learning models or the one or more new machine learning models to customer platform 110, or may provide instructions to customer platform 110 to eliminate the one or more machine learning models. In this way, analytics platform 115 may improve the machine learning models to more effectively determine customer actions based on customer events, to determine more effective customer actions based on customer events, and/or the like. For example, the improved machine learning models may identify and employ customer actions that produce more desirable customer results (e.g., purchase of new products or services, upgrade of products or services, increased revenues, and/or the like), and may identify and avoid customer actions that produce less desirable customer results (e.g., loss of customers, reduced revenues, and/or the like).

Figure 1F:
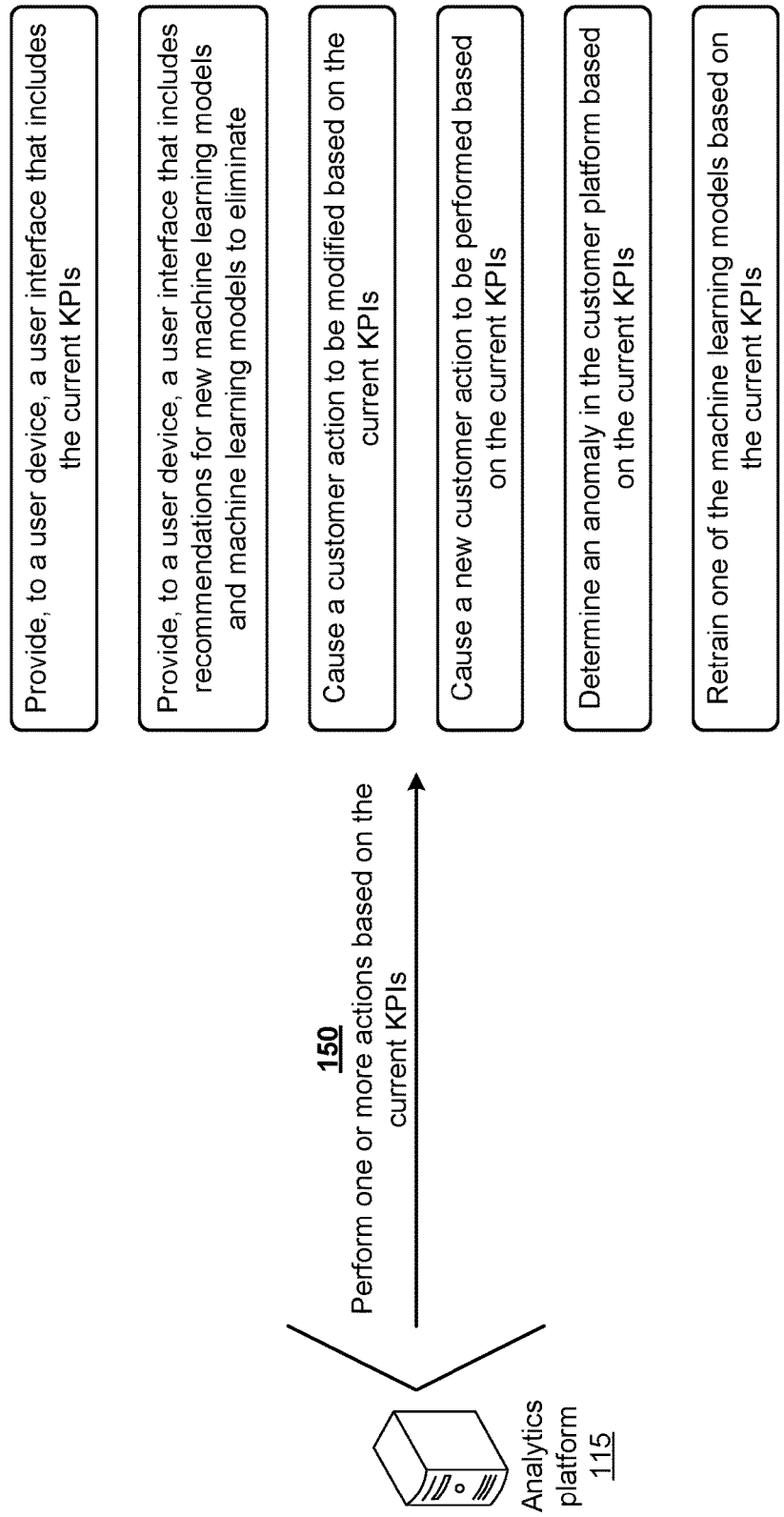

As shown in FIG. 1F, and by reference number 150, analytics platform 115 may perform one or more actions based on the current KPIs. The one or more actions may include analytics platform 115 providing, to a user device, a user interface that includes the current KPIs. For example, analytics platform 115 may provide, to user device 105 associated with the entity, a graphical user interface that includes graphical representations (e.g., a digital dashboard that includes charts, graphs, tables, trends, and/or the like) associated with the current KPIs. In this way, analytics platform 115 may enable the entity to track the current KPIs related to the customers in near-real time, and to quickly and efficiently improve, based on the current KPIs, the customer actions to be taken based on future customer event data.

The one or more actions may include analytics platform 115 providing, to a user device, a user interface that includes recommendations for new machine learning models and machine learning models to eliminate. For example, analytics platform 115 may provide, to user device 105 associated with the entity and/or a user of customer platform 110, a user interface that includes data identifying new machine learning models to be added to customer platform 110, a recommendation to eliminate one or more machine learning models from customer platform 110, and/or the like. A user of user device 105 may utilize the user interface to select one or more of the new machine learning models to add to customer platform 110, one or more of the recommended machine learning models to eliminate, and/or the like. In this way, analytics platform 115 may provide, to customer platform 110, improved machine learning models that generate improved customer actions to be taken based on future customer event data. In turn, the improved customer actions may generate improved customer results, which may conserve resources (e.g., computing resources, communication resources, networking resources, and/or the like).

The one or more actions may include analytics platform 115 causing a customer action to be modified based on the current KPIs. For example, analytics platform 115 may replace, based on the current KPIs, a first customer action based on particular customer event data (e.g., initiating a call from a live agent of the entity to address a particular issue) with a second customer action (e.g., initiating a chat bot to address the particular issue) that produces more desirable customer results (e.g., cost reduction) than the first customer action in response to the particular customer event data. In this way, analytics platform 115 may improve customer results, which may increase revenues and savings, conserve resources, and/or the like.

The one or more actions may include analytics platform 115 causing a new customer action to be performed based on the current KPIs. For example, analytics platform 115 may add a new customer action (e.g., a representative of the entity answering a customer question, a telephone call by a live agent of the entity, an upgrade of a product or a service, and/or the like) to respond to a new customer event, which may improve customer results. In this way, analytics platform 115 may increase revenues and savings, conserve resources, and/or the like.

The one or more actions may include analytics platform 115 determining an anomaly in customer platform 110 based on the current KPIs. For example, analytics platform 115 may identify an increase or a decrease in customer engagements, an absence of customer transactions, and/or the like due to a catastrophic event (e.g., a service outage, a hurricane, and/or the like). In this way, analytics platform 115 may isolate anomalies that might otherwise cause customer events to be misinterpreted, thereby conserving resources (e.g., computing resources, communication resources, networking resources, and/or the like) that would otherwise be wasted pursuing customer actions that are not warranted by the customer events.

The one or more actions may include analytics platform 115 retraining one of the machine learning models based on the current KPIs, as described above. In this way, analytics platform 115 may improve the accuracy of the machine learning models in determining customer actions based on customer event data, which may improve speed and efficiency of the machine learning models and conserve computing resources, communication resources, networking resources, and/or the like. Furthermore, retraining the machine learning models may improve the effectiveness of the customer actions calculated by the machine learning models, which may improve customer results (e.g., increasing revenues, reducing costs, and/or the like).

The one or more actions may include analytics platform 115 determining a new customer engagement for a particular customer, of the customers, based on the current KPIs, and causing customer platform 110 to implement the new customer engagement. In this way, analytics platform 115 can automatically increase desirable customer interactions, improve customer relationships, increase opportunities to provide new products and/or services to customers, and/or the like, thereby increasing revenues, market share, and/or the like.

The one or more actions may include analytics platform 115 determining, based on the current KPIs, whether a particular customer action, of the customer actions, satisfies an expectation threshold (e.g., a particular revenue level, a particular cost savings, and/or the like), and causing customer platform 110 to eliminate the particular customer action when the particular customer action fails to satisfy the expectation threshold. In this way, analytics platform 115 may eliminate customer actions that do not provide sufficient advantages to warrant continued investment in the customer actions, thereby conserving resources that would otherwise be wasted in pursuing such customer actions.

Figure 1G:
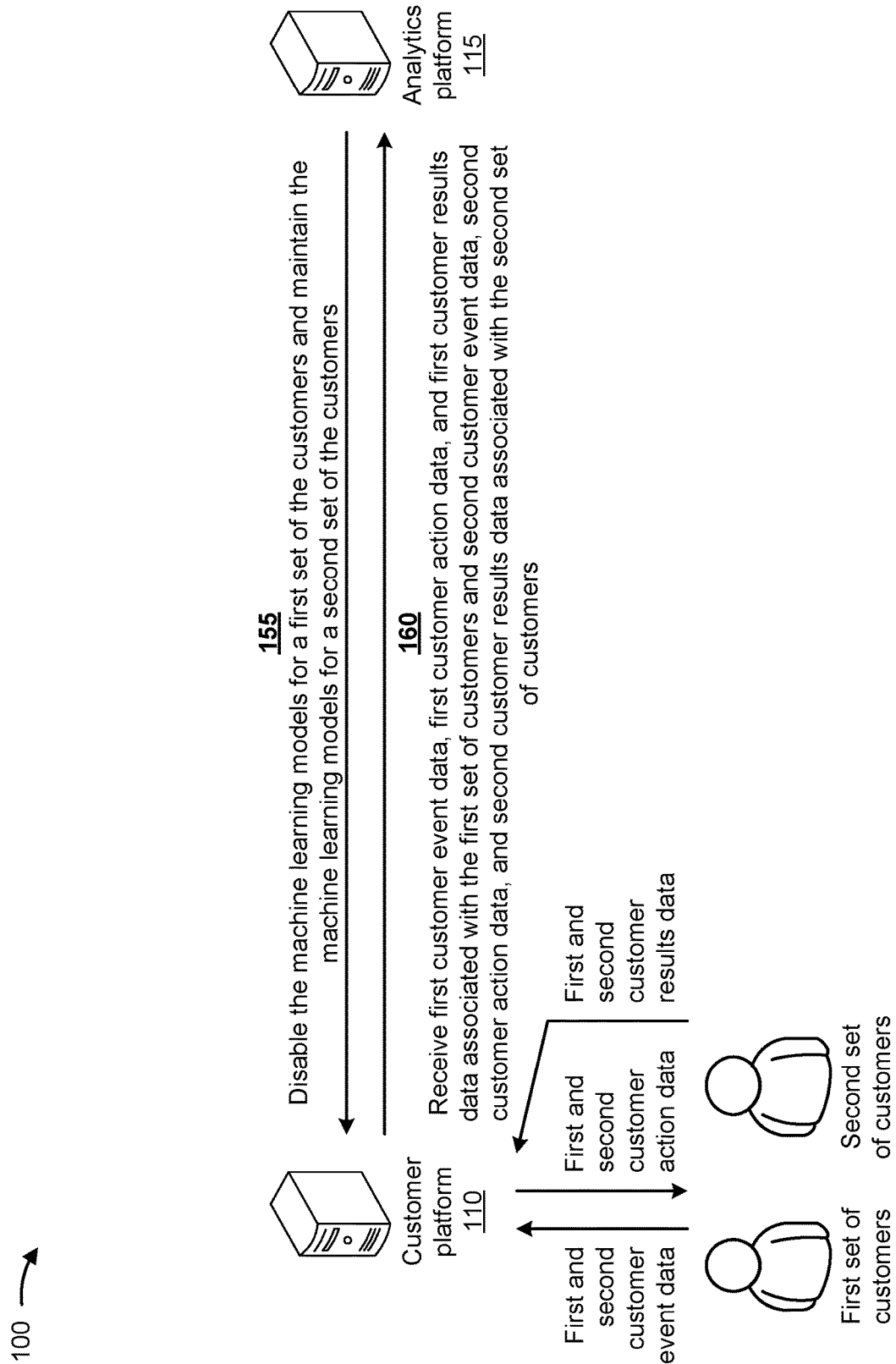

As shown in FIG. 1G, and by reference number 155, analytics platform 115 may disable the machine learning models for a first set of the customers and maintain the machine learning models for a second set of the customers. In some implementations, analytics platform 115 may disable the machine learning models for a first percentage of customers and may enable the machine learning models associated for a second percentage of customers. For example, analytics platform 115 may disable the machine learning models for 90% of the customers and may enable the machine learning models for 10% of the customers, may disable the machine learning models for 80% of the customers and may enable the machine learning models for 20% of the customers, and/or the like.

As further shown in FIG. 1G, and shown by reference number 160, analytics platform 115 may receive first customer event data, first customer action data, and first customer results data associated with the first set of customers, and may receive second customer event data, second customer action data, and second customer results data associated with the second set of customers. In this case, the first customer action data may not be generated by the machine learning models, and the second customer action data may be generated by the machine learning models. In some implementations, customer platform 110 may receive the first customer event data from the first set of customers and may receive the second customer event data from the second set of customers. Customer platform 110 may perform the first customer actions with respect to the first set of customers and may perform the second customer actions with respect to the second set of customers. Customer platform 110 may receive the first customer results data from the first set of customers and may receive the second customer results data from the second set of customers. The first and second customer event data, customer action data, and customer results may include similar data described above in connection with the customer event data, the customer action data, and the customer results data. Customer platform 110 may provide the first customer event data, the first customer action data, the first customer results data, the second customer event data, the second customer action data, and the second customer results data to analytics platform 115.

Figure 1H:
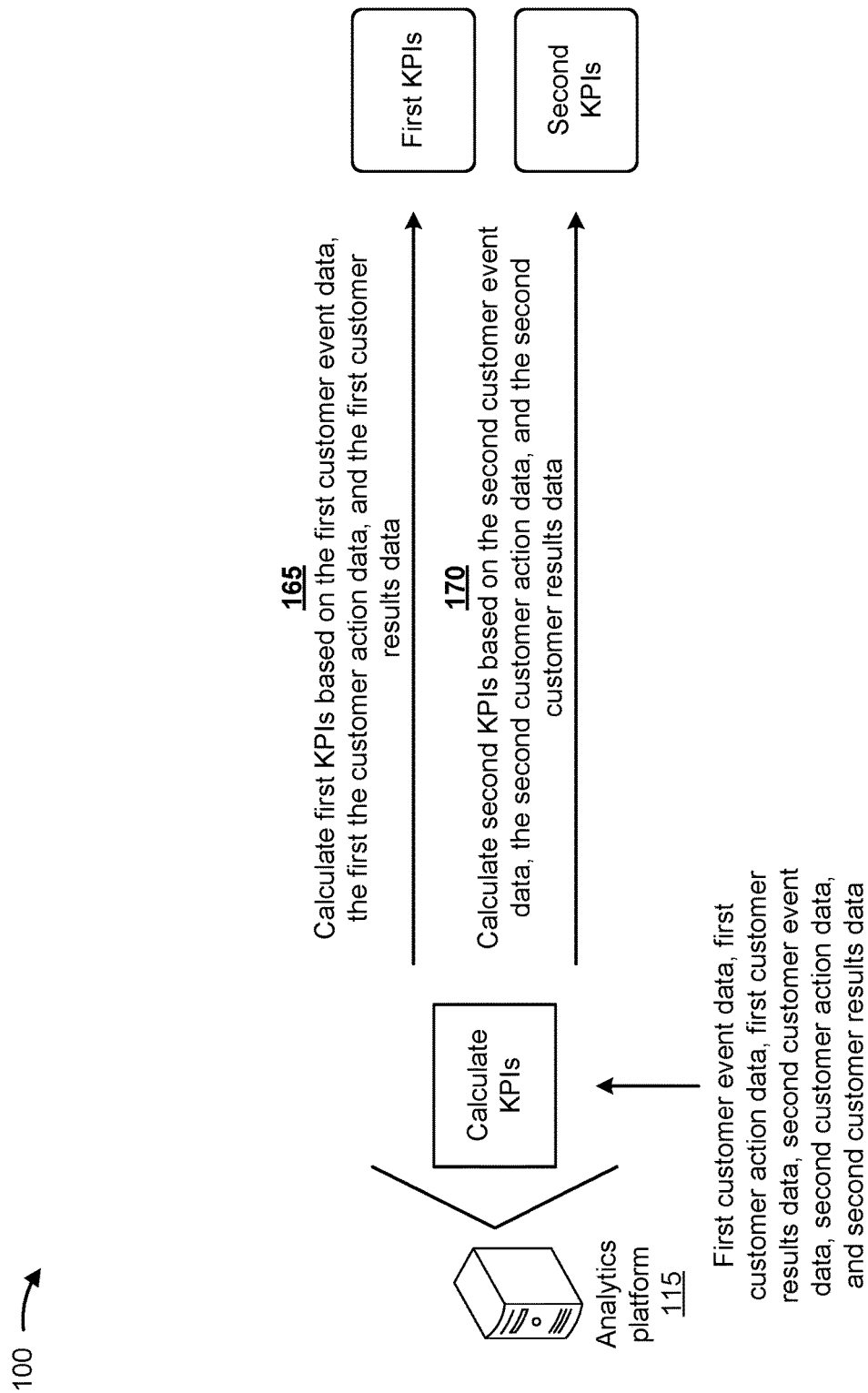

As shown in FIG. 1H, and by reference number 165, analytics platform 115 may calculate first KPIs based on the first customer event data, the first customer action data, and the first customer results data. In some implementations, the first KPIs may include data identifying monetary savings generated for a product or a service of the entity, revenue generated for the product or the service, customer retention savings for the first set of customers, call savings associated with calls between the first set of customers and the entity, dispatch savings associated with preventing dispatch of technicians by the entity, average handle time reductions associated with handling contacts between the first set of customers and the entity, customer churn reduction for the first set of customers, and/or the like.

As further shown in FIG. 1H, and shown by reference number 170, analytics platform 115 may calculate second KPIs based on the second customer event data, the second customer action data, and the second customer results data. In some implementations, the second KPIs may include data identifying monetary savings generated for a product or a service of the entity, revenue generated for the product or the service, customer retention savings for the second set of customers, call savings associated with calls between the second set of customers and the entity, dispatch savings associated with preventing dispatch of technicians by the entity, average handle time reductions associated with handling contacts between the second set of customers and the entity, customer churn reduction for the second set of customers, and/or the like.

Figure 1I:
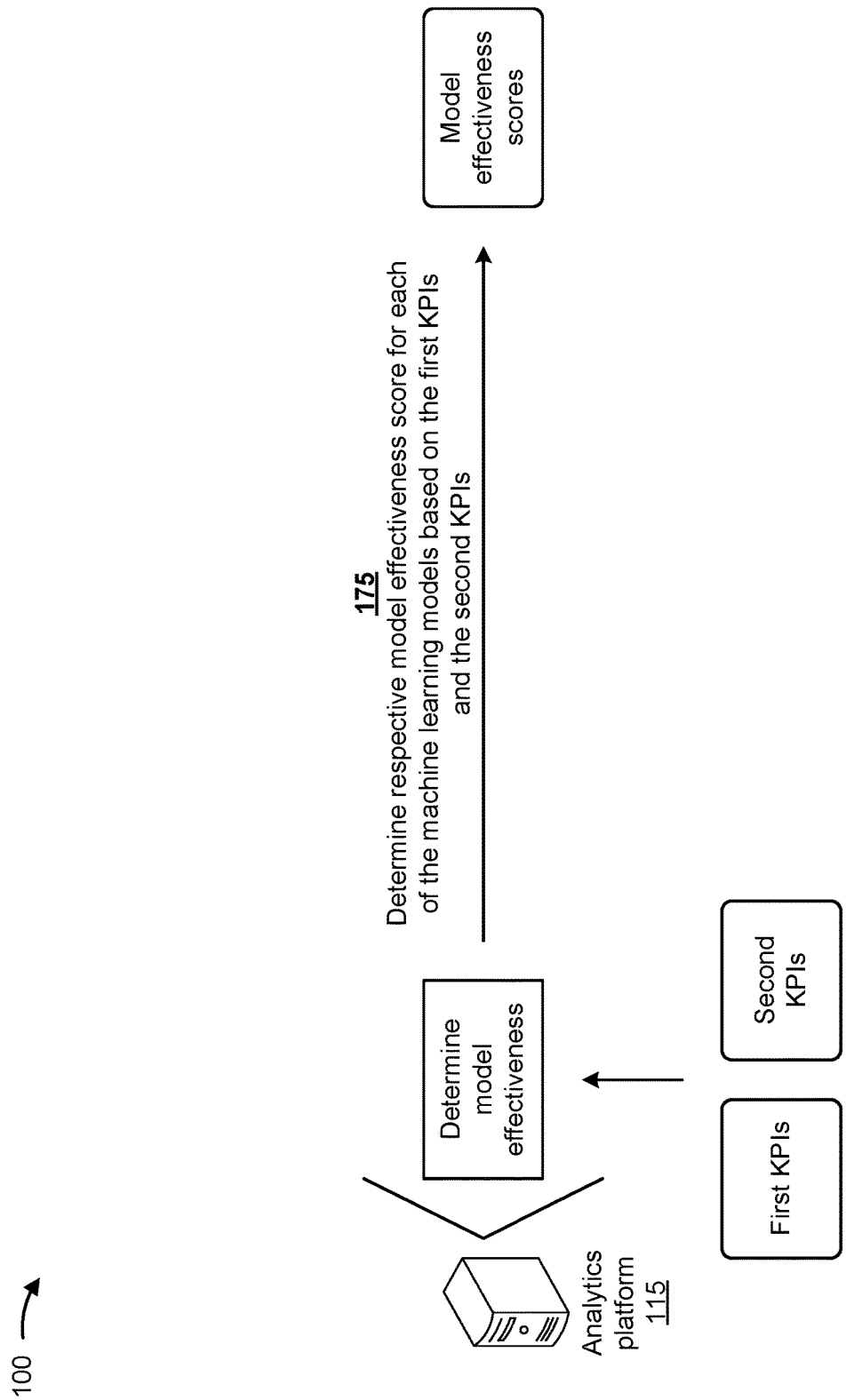

As shown in FIG. 1I, and by reference number 175, analytics platform 115 may determine a respective model effectiveness score for each of the machine learning models based on the first KPIs and the second KPIs. In some implementations, analytics platform 115 may determine a model effectiveness score for each machine learning model by comparing the first KPIs and the second KPIs. For example, the model effectiveness score may be associated with a ratio of the second KPIs (associated with utilization of the machine learning models) to the first KPIs (not associated with utilization of the machine learning models), such that a greater model effectiveness score represents a more effective machine learning model.

As shown in FIG. 1J, and by reference number 180, analytics platform 115 may retrain one or more machine learning models, may add one or more new machine learning models, or may determine to eliminate one or more machine learning models based on the model effectiveness scores. For example, based on the model effectiveness scores, analytics platform 115 may retrain one or more of the machine learning models to generate retrained machine learning models that calculate customer action data based on the customer event data, may add one or more new machine learning models to generate new machine learning models that calculate customer action data based on the customer event data, and/or may determine to eliminate one or more of the machine learning models.

In some implementations, analytics platform 115 may retrain, add, and/or determine to eliminate the machine learning models based on the model effectiveness scores in a manner similar to the manner in which analytics platform 115 retrained, added, and/or determined to eliminate the machine learning models based on the current KPIs, as described above in connection with FIG. 1D. For example, analytics platform 115 may train a new machine learning model or retrain a machine learning model, with the historical customer event data, to determine customer action data associated with customer actions to be taken in response to occurrence of the events, as described above.

In some implementations, rather than training new machine learning models or retraining the machine learning model, analytics platform 115 may receive one or more trained machine learning models from another device (e.g., a server device, customer platform 110, and/or the like). For example, the other device may generate the one or more trained machine learning models based on having trained one or more machine learning models in a manner similar to that described above, and may provide the trained machine learning models to analytics platform 115 (e.g., may preload analytics platform 115 with the trained machine learning models, may receive a request from analytics platform 115 for the trained machine learning models, and/or the like).

Figure 1K:
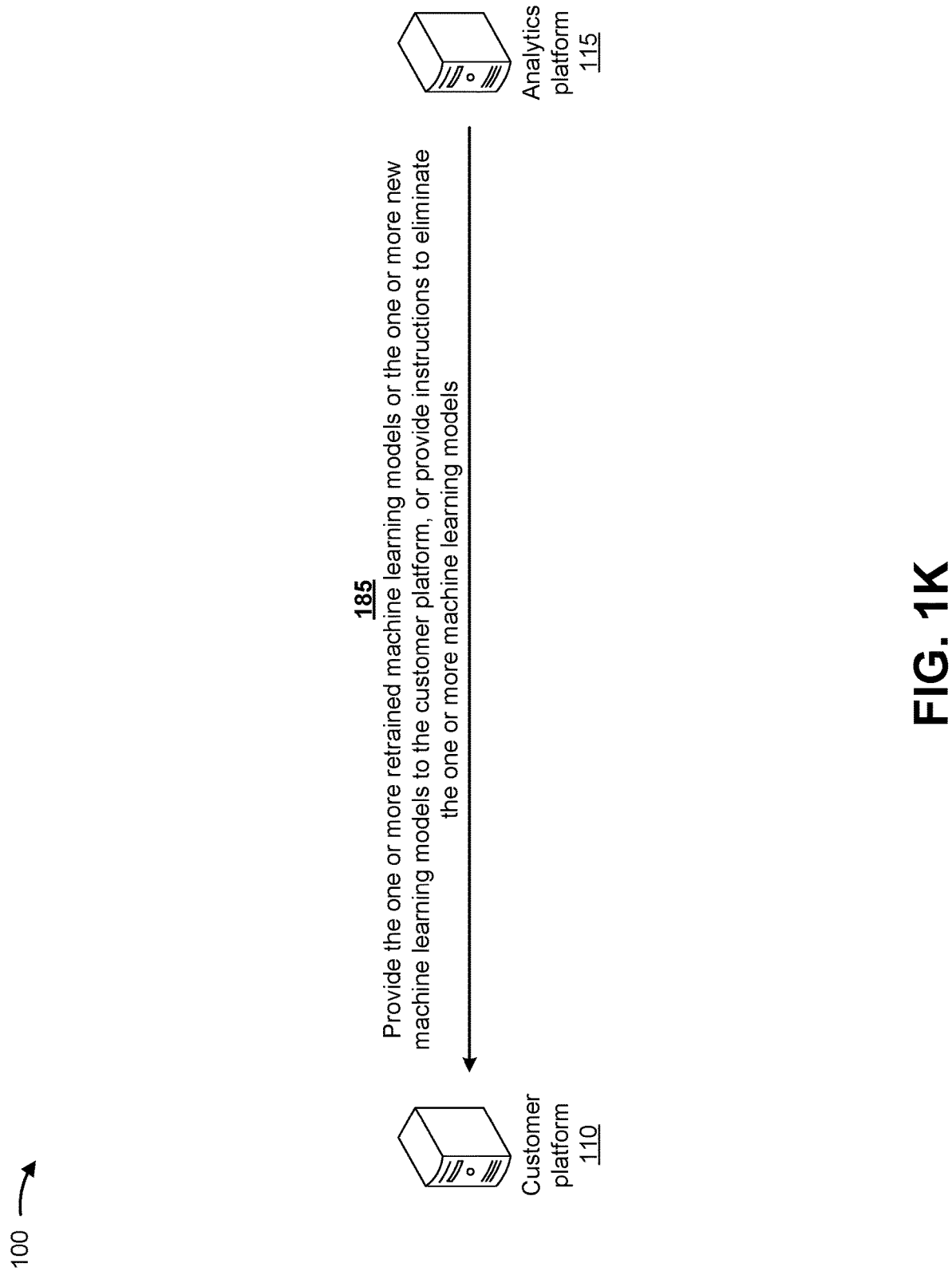

As shown in FIG. 1K, and by reference number 185, analytics platform 115 may provide the one or more retrained machine learning models or the one or more new machine learning models to customer platform 110, or may provide instructions to customer platform 110 to eliminate the one or more machine learning models. In this way, analytics platform 115 may provide, based on the model effectiveness scores, improved machine learning models that more effectively determine customer actions based on customer events, that determine more effective customer actions based on customer events, and/or the like. For example, the improved machine learning models may identify and employ customer actions that produce more desirable customer results (e.g., purchase of new products or services, upgrade of products or services, increased revenues, and/or the like), and may identify and avoid customer actions that produce less desirable customer results (e.g., loss of customers, reduced revenues, and/or the like).

In this way, several different stages of the process for measuring and validating key performance indicators associated with customer solutions and generated by machine learning models is automated, which may remove human subjectivity and waste from the process, and which may improve speed and efficiency of the process and conserve computing resources (e.g., processing resources, memory resources, and/or the like), communication resources, networking resources, and/or the like. Furthermore, implementations described herein use a rigorous, computerized process to perform tasks or roles that were not previously performed or were previously performed using subjective human intuition or input. For example, currently there does not exist a technique that measures and validates, in near-real time, key performance indicators associated with customer solutions and generated by machine learning models. Finally, the process for measuring and validating key performance indicators associated with customer solutions and generated by machine learning models conserves computing resources, communication resources, networking resources, and/or the like that would otherwise be wasted in implementing incorrect customer solutions, identifying the incorrect customer solutions, continuing performance of the incorrect customer solutions, correcting the incorrect customer solutions if discovered, performing measurements that are useless, and/or the like.

As indicated above, FIGS. 1A-1K are provided merely as examples. Other examples may differ from what was described with regard to FIGS. 1A-1K. The number and arrangement of devices and networks shown in FIGS. 1A-1K are provided as an example. In practice, there may be additional devices and/or networks, fewer devices and/or networks, different devices and/or networks, or differently arranged devices and/or networks than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) of FIGS. 1A-1K may perform one or more functions described as being performed by another set of devices of FIGS. 1A-1K.

Figure 2:
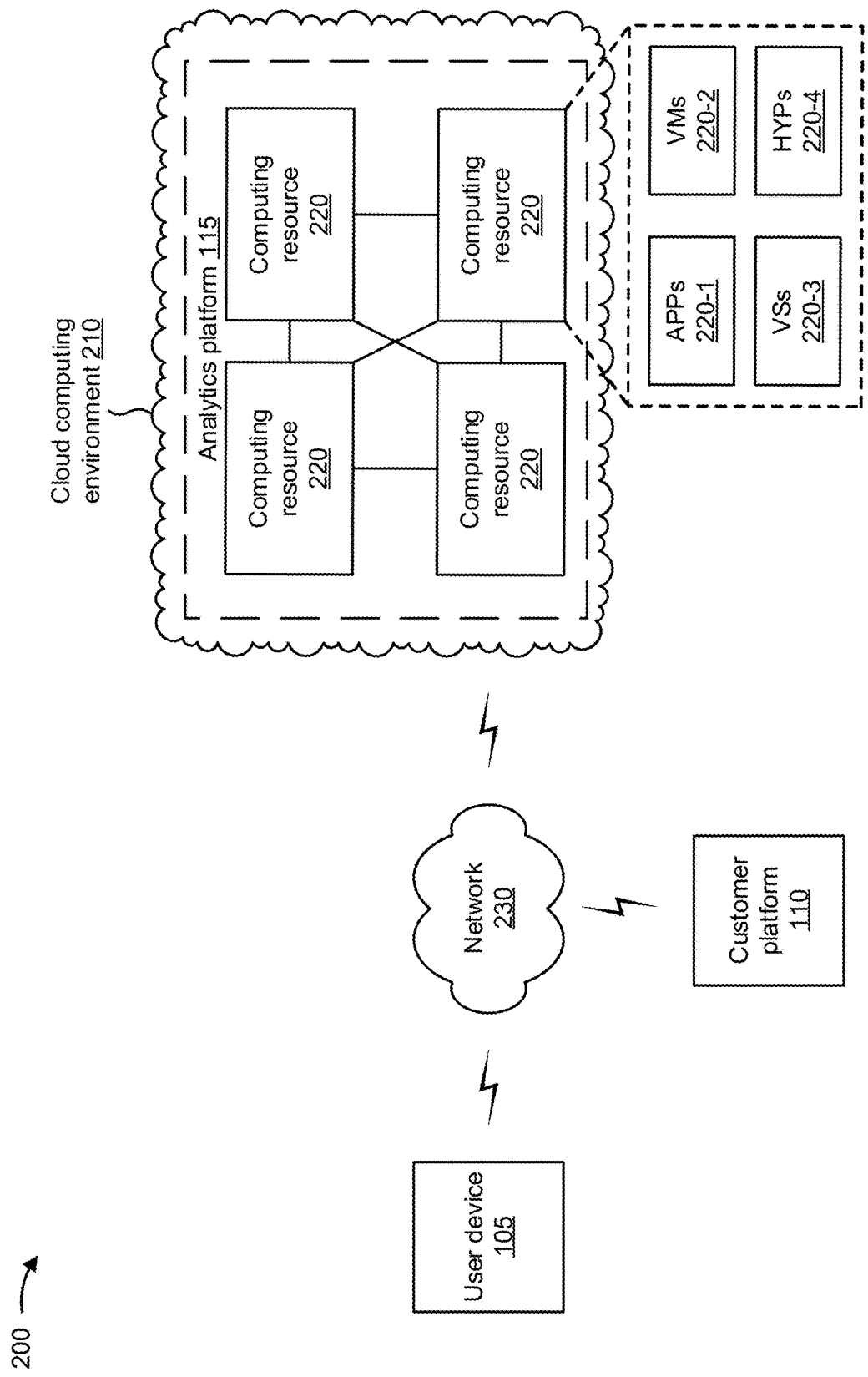
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, an analytics platform 115, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to customer platform 110 and/or analytics platform 115.

Customer platform 110 includes one or more devices that utilize machine learning models to analyze different actions that can be taken for a specific customer and to decide on a best action from the different actions. The best action (e.g., an offer, a proposition, a service, a product, and/or the like) may be determined, by the machine learning models, based on interests and needs of the customer, business objectives and policies of an entity, and/or the like. In some implementations, customer platform 110 may be hosted in a cloud computing environment, may not be cloud-based (i.e., may be implemented outside of a cloud computing environment), may be partially cloud-based, and/or the like. In some implementations, customer platform 110 may receive information from and/or transmit information to user devices 105 and/or analytics platform 115.

Analytics platform 115 includes one or more devices that measure and validate key performance indicators generated by machine learning models of customer platform 110. In some implementations, analytics platform 115 may be designed to be modular such that certain software components may be swapped in or out depending on a particular need. As such, analytics platform 115 may be easily and/or quickly reconfigured for different uses. In some implementations, analytics platform 115 may receive information from and/or transmit information to one or more user devices 105 and/or customer platform 110.

In some implementations, as shown, analytics platform 115 may be hosted in a cloud computing environment 210. Notably, while implementations described herein describe analytics platform 115 as being hosted in cloud computing environment 210, in some implementations, analytics platform 115 may not be cloud-based (i.e., may be implemented outside of a cloud computing environment) or may be partially cloud-based.

Cloud computing environment 210 includes an environment that hosts analytics platform 115. Cloud computing environment 210 may provide computation, software, data access, storage, etc., services that do not require end-user knowledge of a physical location and configuration of system(s) and/or device(s) that hosts analytics platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host analytics platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with analytics platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of analytics platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
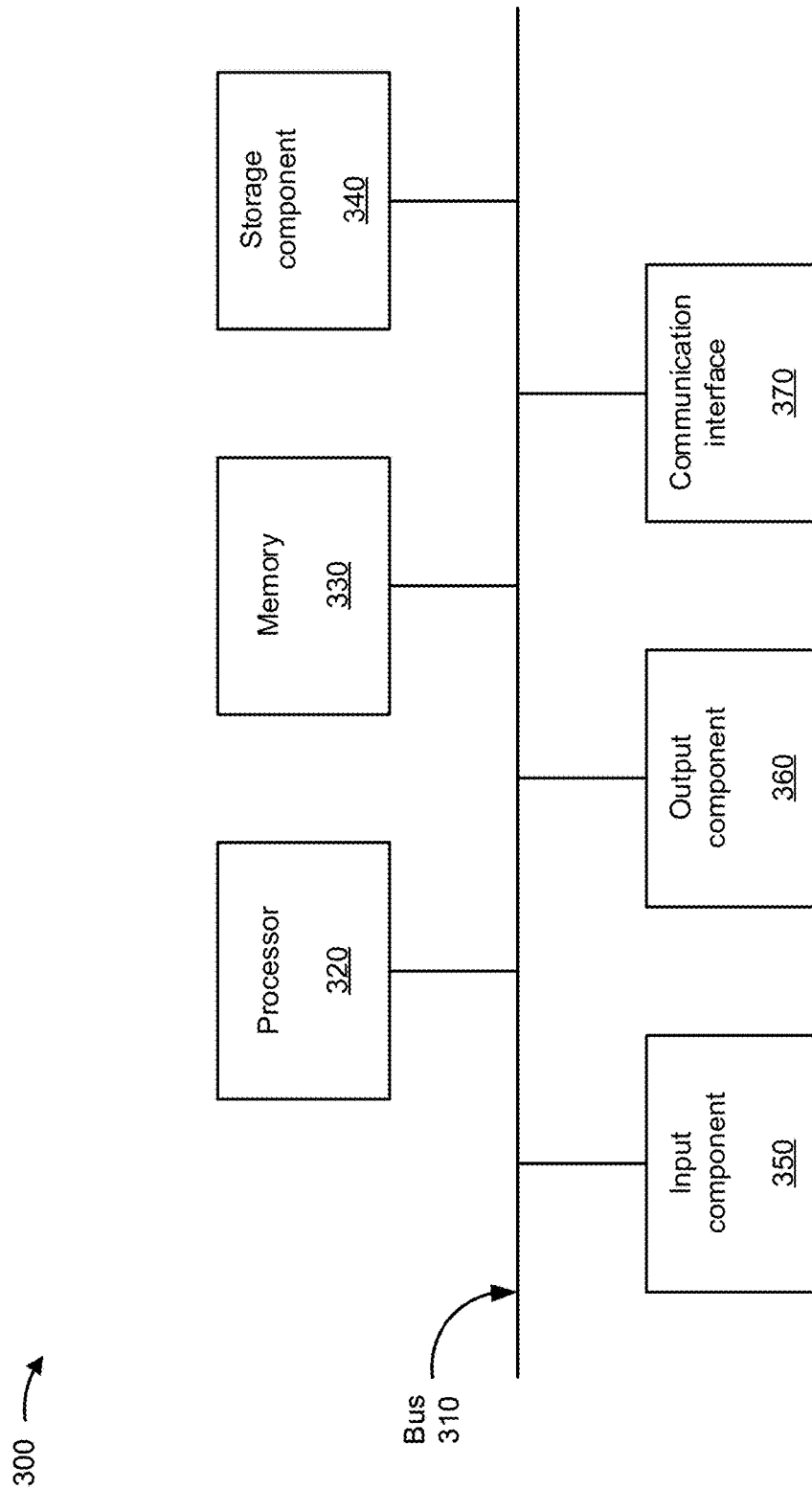
FIG. 3 is a diagram of example components of one or more devices of FIG. 2.

FIG. 3 is a diagram of example components of a device 300. Device 300 may correspond to user device 105, customer platform 110, analytics platform 115, and/or computing resource 220. In some implementations, user device 105, customer platform 110, analytics platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
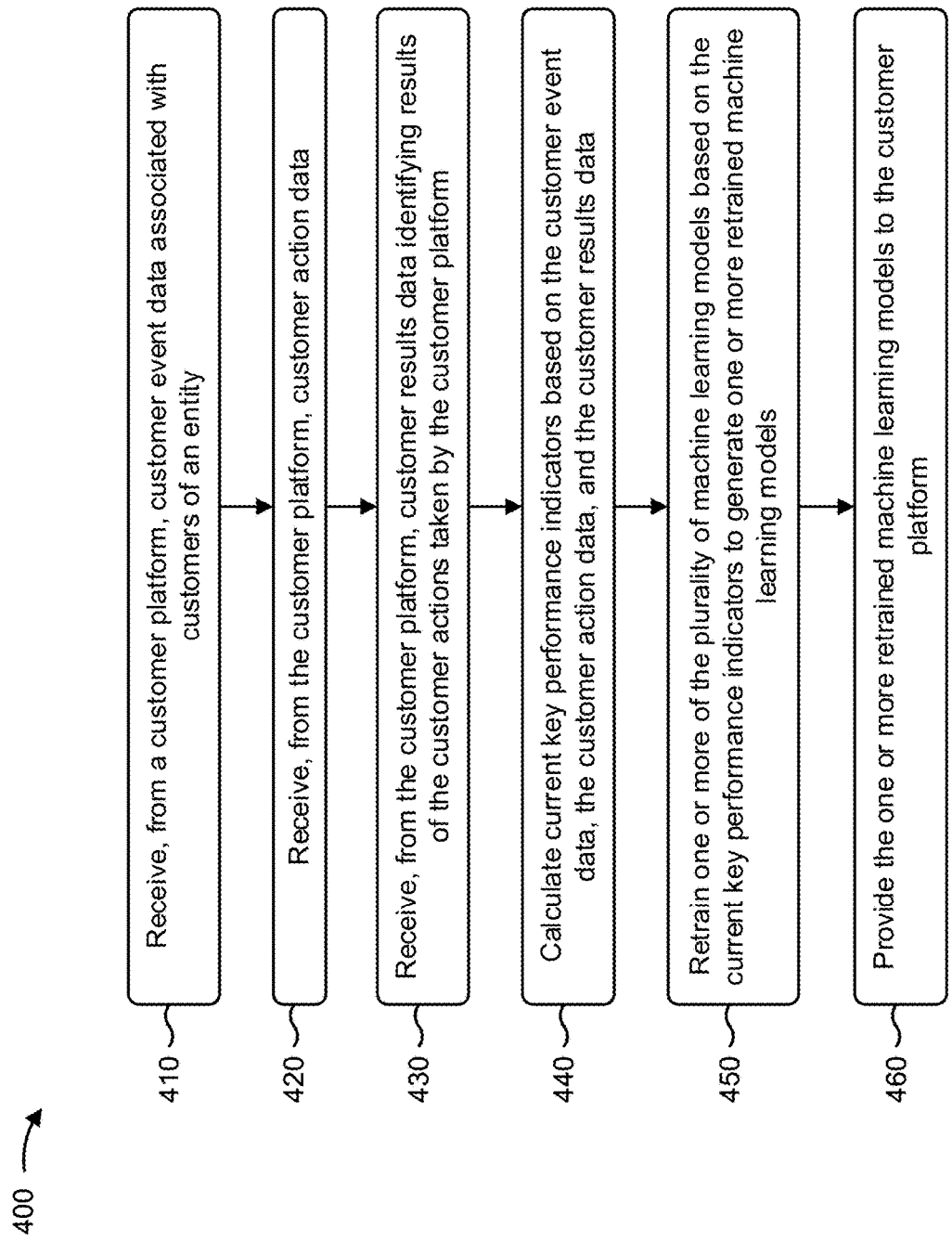
FIG. 4 is a flow chart of an example process for measuring and validating key performance indicators generated by machine learning models.

FIG. 4 is a flow chart of an example process 400 for measuring and validating key performance indicators generated by machine learning models. In some implementations, one or more process blocks of FIG. 4 may be performed by a device (e.g., analytics platform 115). In some implementations, one or more process blocks of FIG. 4 may be performed by another device or a group of devices separate from or including the device, such as a user device (e.g., user device 105) and/or customer platform 110.

As shown in FIG. 4, process 400 may include receiving, from a customer platform, customer event data associated with customers of an entity (block 410). For example, the device (e.g., using computing resource, processor 320, communication interface 370, and/or the like) may receive, from a customer platform, customer event data associated with customers of an entity, as described above. In some implementations, the customer event data may include data identifying events occurring between the customers and the entity, and may be received in near-real time relative to occurrence of the events. In some implementations, the customer event data may be received by the customer platform from a plurality of user devices associated with the customers.

As further shown in FIG. 4, process 400 may include receiving, from the customer platform, customer action data (block 420). For example, the device (e.g., using computing resource, processor 320, communication interface 370, and/or the like) may receive, from the customer platform, customer action data, as described above. In some implementations, the customer action data may include data identifying customer actions to be taken by the customer platform in response to the occurrence of the events. In some implementations, the customer action data may be generated by a plurality of machine learning models, and may be received in near-real time relative to generation of the customer actions by the plurality of machine learning models. In some implementations, the customer actions may be performed by the customer platform and via a plurality of user devices associated with the customers.

As further shown in FIG. 4, process 400 may include receiving, from the customer platform, customer results data identifying results of the customer actions taken by the customer platform (block 430). For example, the device (e.g., using computing resource, processor 320, memory 330, communication interface 370, and/or the like) may receive, from the customer platform, customer results data identifying results of the customer actions taken by the customer platform, as described above.

As further shown in FIG. 4, process 400 may include calculating current key performance indicators based on the customer event data, the customer action data, and the customer results data (block 440). For example, the device (e.g., using computing resource, processor 320, memory 330, storage component 340, and/or the like) may calculate current key performance indicators based on the customer event data, the customer action data, and the customer results data, as described above. In some implementations, the current key performance indicators may provide information indicating monetary savings generated for a product or a service of the entity, revenue generated for the product or the service, customer retention savings for the customers, or customer churn reduction for the customers.

As further shown in FIG. 4, process 400 may include retraining one or more of the plurality of machine learning models based on the current key performance indicators to generate one or more retrained machine learning models (block 450). For example, the device (e.g., using computing resource, processor 320, memory 330, and/or the like) may retrain one or more of the plurality of machine learning models based on the current key performance indicators to generate one or more retrained machine learning models, as described above.

As further shown in FIG. 4, process 400 may include providing the one or more retrained machine learning models to the customer platform (block 460). For example, the device (e.g., using computing resource, processor 320, memory 330, storage component 340, communication interface 370, and/or the like) may provide the one or more retrained machine learning models to the customer platform, as described above.

Process 400 may include additional implementations, such as any single implementation or any combination of implementations described below and/or in connection with one or more other processes described elsewhere herein.

In some implementations, process 400 may include generating one or more new machine learning models based on the current key performance indicators, and providing the one or more new machine learning models to the customer platform.

In some implementations, process 400 may include determining that one of the plurality of machine learning models is to be eliminated based on the current key performance indicators, and providing, to the customer platform, an instruction to eliminate the one of the plurality of machine learning models.

In some implementations, process 400 may include performing one or more actions based on the current key performance indicators. The one or more actions may include one or more of: providing, to a user device, a user interface that includes the current key performance indicators; providing, to a user device, a user interface that includes a recommendation for a new machine learning model or a recommendation to eliminate one of the plurality of machine learning models; causing one of the customer actions to be modified by the customer platform based on one or more of the current key performance indicators; causing a new customer action to be performed by the customer platform based on one or more of the current key performance indicators; or determining an anomaly in the customer platform based on the current key performance indicators.

In some implementations, process 400 may include causing the customer platform to disable the plurality of machine learning models for a first set of the customers; causing the customer platform to maintain the plurality of machine learning models for a second set of the customers; receiving, from the customer platform, first customer event data associated with the first set of the customers; receiving, from the customer platform, first customer action data identifying first customer actions to be taken by the customer platform in response to the first customer event data; receiving, from the customer platform, first customer results data identifying first results of the first customer actions taken by the customer platform; receiving, from the customer platform, second customer event data associated with the second set of the customers; receiving, from the customer platform, second customer action data identifying second customer actions to take in response to the second customer event data, the second customer action data being generated by the plurality of machine learning models; receiving, from the customer platform, second customer results data identifying second results of the second customer actions taken by the customer platform; calculating first key performance indicators based on the first customer event data, the first customer action data, and the first customer results data; calculating second key performance indicators based on the second customer event data, the second customer action data, and the second customer results data; and determining respective model effectiveness scores for the plurality of machine learning models based on the first key performance indicators and the second key performance indicators.

In some implementations, process 400 may include retraining a particular machine learning model, of the plurality of machine learning models, based on one or more of the model effectiveness scores associated with the particular machine learning model; generating a new machine learning model based on the one or more model effectiveness scores; or eliminating one of the plurality of machine learning models based on the one or more model effectiveness scores.

In some implementations, process 400 may include determining, based on the current key performance indicators, whether a particular customer action, of the customer actions, satisfies an expectation threshold, and causing the customer platform to eliminate the particular customer action when the particular customer action fails to satisfy the expectation threshold.

In some implementations, process 400 may include providing a user interface that includes a summary of the customer event data, a summary of the customer action data, a summary of the customer results data, and a summary of the current key performance indicators.

In some implementations, process 400 may include determining a new customer engagement for a particular customer, of the customers, based on the current key performance indicators, and causing the customer platform to implement the new customer engagement.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a customer platform, customer event data associated with customers of an entity,
      the customer event data including data identifying events occurring between the customers and the entity, and
      the customer event data being received in near-real time relative to occurrence of the events;
   receiving, by the device and from the customer platform, customer action data,
      the customer action data including data identifying customer actions to be taken by the customer platform in response to the occurrence of the events,
      the customer action data being generated by a plurality of machine learning models, and
      the customer action data being received in near-real time relative to generation of the customer action data by the plurality of machine learning models;
   receiving, by the device and from the customer platform, customer results data identifying results of the customer actions taken by the customer platform;
   calculating, by the device, current key performance indicators based on the customer event data, the customer action data, and the customer results data,
      wherein the current key performance indicators relate to an impact of the plurality of machine learning models on the entity;
   retraining, by the device, one or more of the plurality of machine learning models based on the current key performance indicators to generate one or more retrained machine learning models; and
   providing, by the device, the one or more retrained machine learning models to the customer platform.

2. The method of claim 1, further comprising:
   generating one or more new machine learning models based on the current key performance indicators; and
   providing the one or more new machine learning models to the customer platform.

3. The method of claim 1, further comprising:
   determining that one of the plurality of machine learning models is to be eliminated based on the current key performance indicators; and
   providing, to the customer platform, an instruction to eliminate the one of the plurality of machine learning models.

4. The method of claim 1, further comprising:
   performing one or more actions based on the current key performance indicators.

5. The method of claim 4, wherein performing the one or more actions comprises one or more of:
   providing, to a user device, a user interface that includes the current key performance indicators;
   providing, to the user device, a user interface that includes a recommendation for a new machine learning model or a recommendation to eliminate one of the plurality of machine learning models;
   causing one of the customer actions to be modified by the customer platform based on one or more of the current key performance indicators;
   causing a new customer action to be performed by the customer platform based on one or more of the current key performance indicators; or
   determining an anomaly in the customer platform based on the current key performance indicators.

6. The method of claim 1, further comprising:
   causing the customer platform to disable the plurality of machine learning models for a first set of the customers;
   causing the customer platform to maintain the plurality of machine learning models for a second set of the customers;
   receiving, from the customer platform, first customer event data associated with the first set of the customers;
   receiving, from the customer platform, first customer action data identifying first customer actions to be taken by the customer platform in response to the first customer event data;
   receiving, from the customer platform, first customer results data identifying first results of the first customer actions taken by the customer platform;
   receiving, from the customer platform, second customer event data associated with the second set of the customers;
   receiving, from the customer platform, second customer action data identifying second customer actions to take in response to the second customer event data,
      wherein the second customer action data is generated by the plurality of machine learning models;
   receiving, from the customer platform, second customer results data identifying second results of the second customer actions taken by the customer platform;
   calculating first key performance indicators based on the first customer event data, the first customer action data, and the first customer results data;

calculating second key performance indicators based on the second customer event data, the second customer action data, and the second customer results data; and determining respective model effectiveness scores for the plurality of machine learning models based on the first key performance indicators and the second key performance indicators.

7. The method of claim 6, further comprising one or more of:

retraining a particular machine learning model, of the plurality of machine learning models, based on one or more of the model effectiveness scores associated with the particular machine learning model;

generating a new machine learning model based on the one or more model effectiveness scores; or eliminating one of the plurality of machine learning models based on the one or more model effectiveness scores.

8. A device, comprising:

one or more memories; and one or more processors, communicatively coupled to the one or more memories, configured to:

receive, from a customer platform, customer event data associated with customers of an entity,
wherein the customer event data includes data identifying events occurring between the customers and the entity, and
wherein the customer event data is received in near-real time relative to occurrence of the events;

receive, from the customer platform, customer action data,
wherein the customer action data includes data identifying customer actions to be taken by the customer platform in response to the occurrence of the events,
wherein the customer action data is generated by a plurality of machine learning models, and
wherein the customer action data is received in near-real time relative to generation of the customer action data by the plurality of machine learning models;

receive, from the customer platform, customer results data identifying results of the customer actions taken by the customer platform;

calculate current key performance indicators based on the customer event data, the customer action data, and the customer results data,
wherein the current key performance indicators relate to impact of the plurality of machine learning models on the entity; and perform one or more actions based on the current key performance indicators,
wherein the one or more actions include one or more of:
providing a user interface that includes the current key performance indicators,
providing a user interface that includes a recommendation for a new machine learning model or a recommendation to eliminate one of the plurality of machine learning models,
causing one of the customer actions to be modified by the customer platform based on one or more of the current key performance indicators,
causing a new customer action to be performed by the customer platform based on one or more of the current key performance indicators, or determining an anomaly in the customer platform based on the current key performance indicators.

9. The device of claim 8, wherein the current key performance indicators provide information indicating one or more of:

monetary savings generated for a product or a service of the entity, revenue generated for the product or the service, customer retention savings for the customers, or customer churn reduction for the customers.

10. The device of claim 8, wherein the one or more processors are further configured to:

determine, based on the current key performance indicators, whether a particular customer action, of the customer actions, satisfies an expectation threshold; and cause the customer platform to eliminate the particular customer action when the particular customer action fails to satisfy the expectation threshold.

11. The device of claim 8, wherein the customer event data is received by the customer platform from a plurality of user devices associated with the customers.

12. The device of claim 8, wherein the customer actions are performed by the customer platform and via a plurality of user devices associated with the customers.

13. The device of claim 8, wherein the one or more processors are further configured to:

provide a user interface that includes:
a summary of the customer event data,
a summary of the customer action data,
a summary of the customer results data, and
a summary of the current key performance indicators.

14. The device of claim 8, wherein the one or more processors are further configured to:

determine a new customer engagement for a particular customer, of the customers, based on the current key performance indicators; and cause the customer platform to implement the new customer engagement.

15. A non-transitory computer-readable medium storing instructions, the instructions comprising:

one or more instructions that, when executed by one or more processors, cause the one or more processors to:

receive, from a customer platform, customer event data associated with customers of an entity,
wherein the customer event data includes data identifying events occurring between the customers and the entity, and
wherein the customer event data is received in near-real time relative to occurrence of the events;

receive, from the customer platform, customer action data,
wherein the customer action data includes data identifying customer actions to be taken by the customer platform in response to the occurrence of the events,
wherein the customer action data is generated by a plurality of machine learning models, and
wherein the customer action data is received in near-real time relative to generation of the customer action data;

receive, from the customer platform, customer results data identifying results of the customer actions taken by the customer platform;

calculate current key performance indicators based on the customer event data, the customer action data, and the customer results data, wherein the current key performance indicators relate to an impact of the plurality of machine learning models on the entity;

retrain one or more of the plurality of machine learning models based on the current key performance indicators to generate one or more retrained machine learning models;

generate one or more new machine learning models based on the current key performance indicators; and provide the one or more retrained machine learning models and the one or more new machine learning models to the customer platform.

16. The non-transitory computer-readable medium of claim 15, wherein the instructions further comprise:
one or more instructions that, when executed by the one or more processors, cause the one or more processors to:
determine that one of the plurality of machine learning models is to be eliminated based on the current key performance indicators; and
provide, to the customer platform, an instruction to eliminate the one of the plurality of machine learning models.

17. The non-transitory computer-readable medium of claim 15, wherein the instructions further comprise:
one or more instructions that, when executed by the one or more processors, cause the one or more processors to one or more of:
provide, to a user device, a user interface that includes the current key performance indicators;
provide, to a user device, a user interface that includes a recommendation for a new machine learning model or a recommendation to eliminate one of the plurality of machine learning models;
cause one of the customer actions to be modified by the customer platform based on one or more of the current key performance indicators;
cause a new customer action to be performed by the customer platform based on one or more of the current key performance indicators; or
determine an anomaly in the customer platform based on the current key performance indicators.

18. The non-transitory computer-readable medium of claim 15, wherein the instructions further comprise:
one or more instructions that, when executed by the one or more processors, cause the one or more processors to:
cause the customer platform to disable the plurality of machine learning models for a first set of the customers;
cause the customer platform to maintain the plurality of machine learning models for a second set of the customers;
receive, from the customer platform, first customer event data associated with the first set of the customers;
receive, from the customer platform, first customer action data identifying first customer actions to be taken by the customer platform in response to the first customer event data;
receive, from the customer platform, first customer results data identifying first results of the first customer actions taken by the customer platform;
receive, from the customer platform, second customer event data associated with the second set of the customers;
receive, from the customer platform, second customer action data identifying second customer actions to be taken by the customer platform in response to the second customer event data,
wherein the second customer action data is generated by the plurality of machine learning models;
receive, from the customer platform, second customer results data identifying second results of the first customer actions taken by the customer platform;
calculate first key performance indicators based on the first customer event data, the first customer action data, and the first customer results data;
calculate second key performance indicators based on the second customer event data, the second customer action data, and the second customer results data; and
determine respective model effectiveness scores for the plurality of machine learning models based on the first key performance indicators and the second key performance indicators.

19. The non-transitory computer-readable medium of claim 18, wherein the instructions further comprise:
one or more instructions that, when executed by the one or more processors, cause the one or more processors to one or more of:
retrain a particular machine learning model, of the plurality of machine learning models, based on one or more of the model effectiveness scores associated with the particular machine learning model;
generate a new machine learning model for the plurality of machine learning models based on the one or more model effectiveness scores; or
determine to eliminate one of the plurality of machine learning models based on the one or more model effectiveness scores.

20. The non-transitory computer-readable medium of claim 15, wherein the instructions further comprise:
one or more instructions that, when executed by the one or more processors, cause the one or more processors to one or more of:
determine, based on the current key performance indicators, whether a particular customer action, of the customer actions, satisfies an expectation threshold; and
cause the customer platform to eliminate the particular customer action when the particular customer action fails to satisfy the expectation threshold.

\* \* \* \* \*